(12) United States Patent  
Forkosh et al.

(10) Patent No.: US 9,275,470 B1  
(45) Date of Patent: Mar. 1, 2016

(54) COMPUTER VISION SYSTEM FOR TRACKING BALL MOVEMENT AND ANALYZING USER SKILL

(71) Applicant: NAROBO, INC., Woodmere, NY (US)

(72) Inventors: Eric Forkosh, Woodmere, NY (US); Marc Forkosh, Woodmere, NY (US)

(73) Assignee: NAROBO, INC., New York, NY (US)

( * ) Notice: Subject to any disclaimer, the term of this patent is extended or adjusted under 35 U.S.C. 154(b) by 0 days.

(21) Appl. No.: 14/707,333

(22) Filed: May 8, 2015

Related U.S. Application Data

(60) Provisional application No. 62/109,056, filed on Jan. 29, 2015.

(51) Int. Cl.
*G06T 7/00* (2006.01)
*G06T 7/20* (2006.01)
*G06T 11/60* (2006.01)

(52) U.S. Cl.
CPC .............. *G06T 7/20* (2013.01); *G06T 7/0042* (2013.01); *G06T 11/60* (2013.01); *G06T 2207/30224* (2013.01)

(58) Field of Classification Search
CPC ......... G06T 7/0042; G06T 7/20; G06T 11/60; G06T 2207/30224
See application file for complete search history.

(56) References Cited

U.S. PATENT DOCUMENTS

| | | | | |
|---|---|---|---|---|
| 5,823,786 A * | 10/1998 | Easterbrook | ....... | A63B 24/0003 434/247 |
| 6,233,007 B1 | 5/2001 | Carlbom | | |
| 6,760,465 B2 * | 7/2004 | McVeigh | ........ | G06T 7/20 382/103 |
| 7,094,164 B2 * | 8/2006 | Marty et al. | ........ | 473/416 |
| 8,280,112 B2 * | 10/2012 | Casamona | ........ | G06T 7/20 382/103 |
| 8,634,592 B2 * | 1/2014 | Casamona | ........ | G06T 7/20 382/103 |
| 8,761,441 B2 * | 6/2014 | Kim et al. | ........ | 382/103 |
| 8,908,922 B2 * | 12/2014 | Marty et al. | ........ | 382/103 |
| 8,953,909 B2 * | 2/2015 | Guckenberger | ........ | G06T 11/00 382/305 |
| 2005/0265580 A1 * | 12/2005 | Antonucci | ........ | G06K 9/00342 382/103 |
| 2006/0023072 A1 * | 2/2006 | Martins | ........ | G06T 7/20 348/207.99 |
| 2008/0102991 A1 * | 5/2008 | Hawkins | ........ | A63B 71/06 473/422 |
| 2012/0114184 A1 * | 5/2012 | Barcons-Palau et al. | ..... | 382/107 |
| 2012/0148099 A1 * | 6/2012 | Kim et al. | ........ | 382/103 |
| 2012/0206577 A1 * | 8/2012 | Guckenberger | ........ | G06T 11/00 348/47 |
| 2013/0256497 A1 * | 10/2013 | Radmard | ........ | 248/558 |
| 2013/0342700 A1 * | 12/2013 | Kass | ........ | 348/159 |
| 2014/0195019 A1 | 7/2014 | Thurman | | |
| 2014/0300733 A1 | 10/2014 | Mitchell | | |
| 2014/0300745 A1 * | 10/2014 | Kirk et al. | ........ | 348/158 |
| 2015/0328516 A1 * | 11/2015 | Coza | ........ | A63B 69/002 473/446 |

FOREIGN PATENT DOCUMENTS

WO    WO2009102813    8/2009
WO    WO2012027726    3/2012

* cited by examiner

*Primary Examiner* — Katrina Fujita
(74) *Attorney, Agent, or Firm* — Lowenstein Sandler LLP

(57) ABSTRACT

A computer processor of the mobile device may overlay a shape graphic on a fixed area of a screen of the mobile device. A camera of the mobile device may search the fixed area for a ball with a marking. The computer processor may recognize the marking on the ball. The computer processor may calibrate the movement of the ball in the overlayed shape graphic in view of the recognized marking of the ball. The camera may track and may record data pertaining to the movement of the ball. The computer processor may calculate one or more metrics relating to ball controlling abilities from the data. The computer processor may display the one or more metrics on the screen.

27 Claims, 8 Drawing Sheets

COMPUTER VISION SYSTEM FOR TRACKING BALL MOVEMENT AND ANALYZING USER SKILL

TECHNICAL FIELD

The present invention relates generally to a system and method for tracking and analyzing a user's interaction with a ball, such as a basketball, soccer ball, etc. More specifically, the invention relates to a mobile device positioning apparatus and a computer vision method. The computer vision method is embodied in software that runs on a mobile device that tracks the movement of a ball over a period of time. This method enables the production of metrics relating to ball control, such as dribble rate, when used with a basketball.

BACKGROUND

In the field of athletics, especially in soccer and basketball, a player's control of the ball is essential to the player becoming a proficient athlete. In basketball, one main aspect of ball control is the player's ability to dribble the ball with maximum control and speed. In soccer, there are a variety of drills to increase ball control, such as ball juggling, which involves keeping the ball in the air by repeatedly kicking it up.

As both soccer and basketball have evolved with new technological advances, there has been an increasing demand for the quantification of a player's skills with respect to handling of the ball. However, the existing means for the average person to measure this skill is very limited, as well as costly.

The related art that provides quantified feedback to basketball users is limited to basketballs containing motion sensors, which measure the player's ball control abilities. These basketballs send users their data via Bluetooth to a mobile smart phone, which displays feedback such as the player's average number of dribbles per second. However, these sensor-enabled basketballs are required to be periodically charged, thereby limiting the portability of the product. Moreover, these expensive sensor embodied basketballs are limited only to data which can be derived from the sensors inside the ball. For example, average dribble height, relative location of the ball, crossover width and other analytical measurements cannot be determined by these basketballs, thus providing the user with very limited feedback regarding his or her dribbling abilities. Other than these expensive sensor-embodied basketballs, there is no other system for the average person to evaluate his ball control abilities.

The related art pertaining to soccer is similar, which is limited to sensor-embodied balls that provide feedback. However, these sensor-embodied balls are overly expensive and inconvenient because they must be periodically charged. Moreover, just as in the case of sensor basketballs, the analytic feedback provided to a user is limited only to the information that the inner sensors can provide.

SUMMARY

The above-described problems are addressed and a technical solution is achieved in the art by providing an apparatus and a method for tracking and analyzing a user's interaction with a ball, such as a basketball, soccer ball, etc., to provide the user with an evaluation of his ball control skills. In the case of basketball, these ball controls abilities include, but are not limited to, dribble rate, crossover-width, location consistency, maximum dribble height, dribble rate variance, dribble speed, and dribble fatigue. In the case of soccer, these ball controls abilities include juggle location consistency, maximum height, and number of juggles. The aforementioned apparatus is a mechanical holder for a mobile device, such as a tablet or smartphone, that positions the device camera at a high enough angle, typically between sixty and ninety degrees, to video capture the user, the ball, and the floor. The method embodied as software utilizes computer vision technology running on a mobile device with a front facing camera. The software identifies a ball and tracks the movement of the ball, as it is being manipulated by the user. As the system is tracking the movement of the ball using the camera, a live video feed is displayed on the mobile device screen, facing the user, with a shape overlayed on the ball's position. The system then analyzes and interprets the movement of the ball to determine specific metrics that relate to the user's ball control abilities.

The above-described problems are addressed and a technical solution is achieved in the art by providing a method for tracking and analyzing a user's interaction with a ball. A computer processor of the mobile device may overlay a shape graphic on a fixed area of a screen of the mobile device. A camera of the mobile device may search the fixed area for a ball with a marking. In one example, the camera may be a front-facing camera of the mobile device. In one example, the marking may be a logo.

The computer processor may recognize the marking on the ball. The computer processor may calibrate the movement of the ball in the overlayed shape graphic in view of the recognized marking of the ball. The camera may track and record data pertaining to the movement of the ball. The computer processor may calculate one or more metrics relating to ball controlling abilities from the data. The computer processor may display on the screen the one or more metrics. In one example, the computer processor may calculate the one or more metrics and may display the one or more metrics responsive to the computer processor detecting that the ball is no longer in motion or a specified time has been reached. In an example, the one or more metrics, e.g., dribble rate, may be calculated and displayed to the user in real-time. In one example, the one or more metrics may be calculated and displayed while ball tracking pertaining to the movement of the ball is taking place.

In an example, the computer processor recognizing the marking on the ball may apply to balls with specific brands or markings. Recognizing the markings on the ball may further comprise applying feature recognition computer vision algorithms to data captured by the computer processor pertaining to the marking. The feature recognition computer vision algorithms may comprise at least one of cross-correlation feature recognition or image matching. The marking may be recognized based on at least one of image, text, or shape.

In an example, calibrating may further comprise the computer processor recognizing one or more colors of the marking and the ball, lighting conditions, or ball pixel diameter. The computer processor may determine ball color spectrum for color blob detection while tracking the movement of the calibrated ball.

In an example, the computer processor tracking the movement of the calibrated ball may comprise the computer processor employing color blob detection, shape recognition, or movement filtering.

In an example, the computer processor may display on the screen a live video feed while the computer processor is tracking the ball.

In an example, responsive to the camera tracking position of the ball on the screen, the computer processor may calculate and store the centroid of the ball, a frame timestamp, and a ball pixel diameter in a memory. The computer processor may estimate depth movement of the ball by examining ball pixel area in the recorded tracking data. The computer processor estimating depth movement of the ball may comprise the computer processor comparing the pixel diameter of the ball to the original pixel diameter acquired during calibration. The computer processor may look up, in a memory of the mobile device, preloaded diameter of the ball corresponding to the marking detected and dynamically determine physical scale for different balls with different markings. The computer processor may convert pixel tracking to physical tracking of the ball in a three-dimensional space in view of determining physical scale. The computer processor may analyze pixel movement of the ball in three dimensions and estimate true physical movement in real three-dimensional space.

In one example, the ball may be a basketball and the one or more metrics may comprise at least one of dribble rate, crossover-width, location consistency, maximum dribble height, dribble rate variance, dribble speed, or dribble fatigue. In one example, the ball may be a soccer ball and the one or more metrics may comprise at least one of juggle location consistency, maximum height, or number of juggles.

In an example, the mobile device may provide a training program that employs the data.

The above-described problems are addressed and a technical solution is achieved in the art by providing a mobile device for tracking and analyzing a user's interaction with a ball.

The mobile device may comprise a memory, a computer processor, operatively coupled to the memory, a screen, coupled to the computer processor; and a camera, coupled to the computer processor. The camera may be configured to search a fixed area of the screen for a ball with a marking and track and record data pertaining to the movement of the ball. The computer processor may be configured to overlay a shape graphic on the fixed area of the screen, recognize the marking on the ball, and may calibrate tracking of the ball in the overlayed shape graphic in view of the recognized marking of the ball. The computer processor may calculate one or more metrics relating to ball controlling abilities from the data and may display on the screen the one or more metrics. In an example, the one or more metrics, e.g., dribble rate, may be calculated and may be displayed to the user in real-time. In one example, the one or more metrics may be calculated and may be displayed while ball tracking pertaining to the movement of the ball is taking place.

In an example, the mobile device may be provided with comprising a positioning apparatus. The mobile device may be configured to be placed in the positioning apparatus. The mobile device may be configured to be placed in the positioning apparatus at a high enough angle to permit video capture of the ball, the user, and a floor on which the user stands. The angle may be between sixty and ninety degrees.

BRIEF DESCRIPTION OF THE DRAWINGS

The present invention will be more readily understood from the detailed description of exemplary embodiments considered in conjunction with the following drawings, of which.

DETAILED DESCRIPTION

Figure 1:
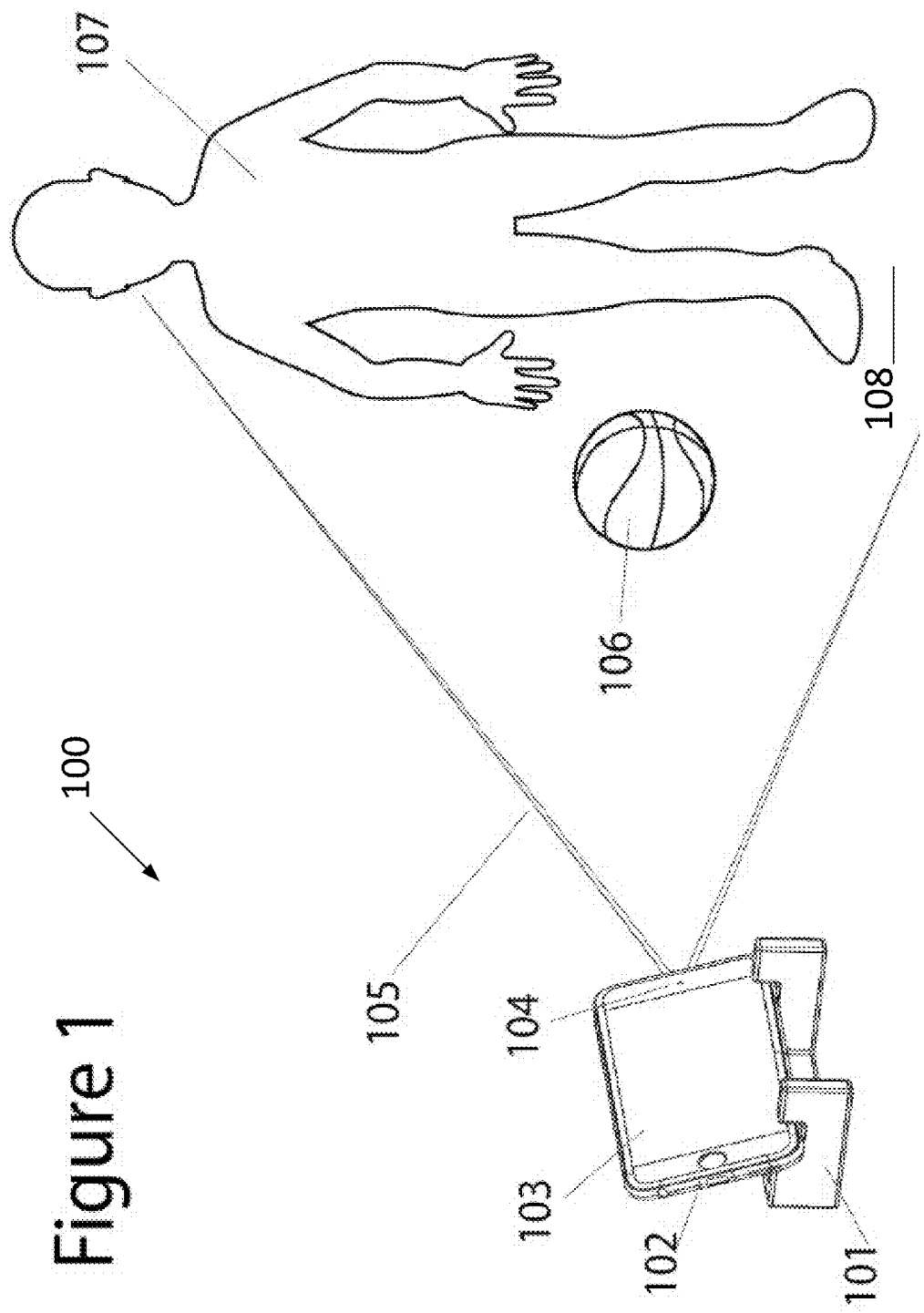
FIG. 1 illustrates a perspective view of a system for tracking and analyzing ball movement.

FIG. 1 illustrates a perspective view of a system 100 for tracking and analyzing ball movement. In one example, a mobile device 102 may be held in the positioning apparatus 101 with the built-in camera 104 capturing video. In one example, the built-in camera 104 may be a front-facing camera 104 of the mobile device 102. In another example, the mobile device 102 may be propped up against an object at an appropriately high angle. The mobile device 102 may run ball tracking and analyzing software, and may display a live video feed on the device screen 103 while ball tracking. The front-facing camera 104, coupled to the front-facing device screen 103, permits the mobile device 102 to be used as a personal ball tracking and skill evaluation system. As is shown in FIG. 1, the positioning apparatus 101 may be angled at a high enough angle to allow video capture of the ball 106, the user 107, and the floor 108. Most mobile device positioning stands available commercially position the mobile device screen at a relatively low angle, such as 45 degrees, to allow easy viewing from a desktop. This low angle, however, does not give permit users 107 to view their movements on the front-facing camera 104 when the device 102 and the stand 101 are on the floor 108 and the user 107 is standing some distance away. On the contrary, the high angle of the mobile device positioning apparatus 101 permits easy viewing from a distance, such as for a user dribbling a basketball several feet away from the mobile device 102. Furthermore, the high angle of the positioning apparatus 101 permits camera capture of the complete view 105 of the environment, including the floor 108.

Figure 2:
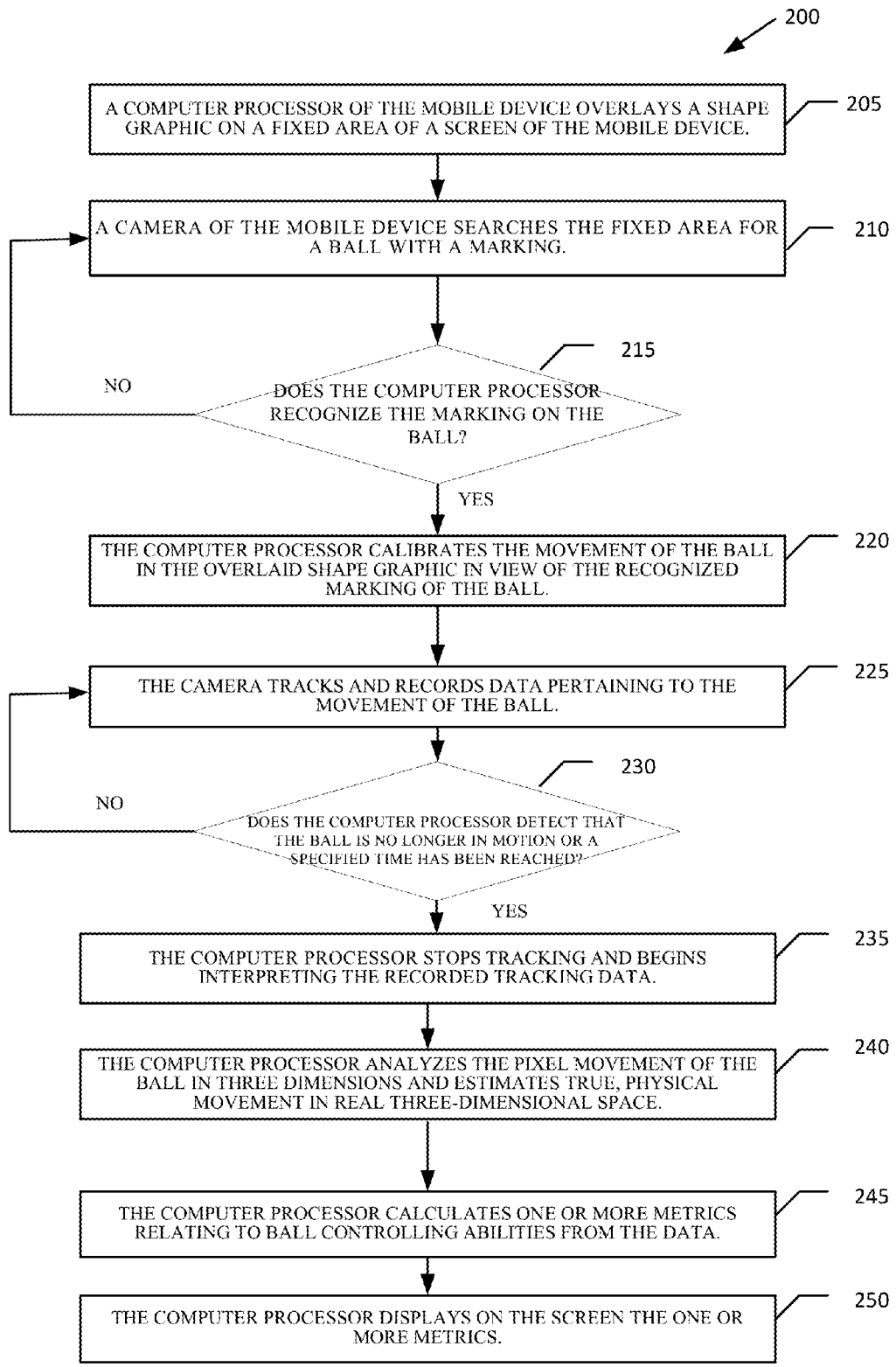
FIG. 2 is a process flow diagram illustrating mobile device interacting with the user, tracking the ball, and determining metrics.

FIG. 2 is a process flow diagram illustrating an example of a method 200 for the mobile device 102 interacting with the user 107, tracking the ball 106, and determining metrics. The method 200 may be performed by a computer system 800 of FIG. 8 which encompasses the computer processor (not shown) of the mobile device 102 of FIG. 1 and may comprise hardware (e.g., circuitry, dedicated logic, programmable logic, microcode, etc.), software (e.g., instructions run on a processing device), or a combination thereof. In one example, the method 200 may be performed by a computer processor (not shown) of the mobile device 102 of FIG. 1.

Figure 3:
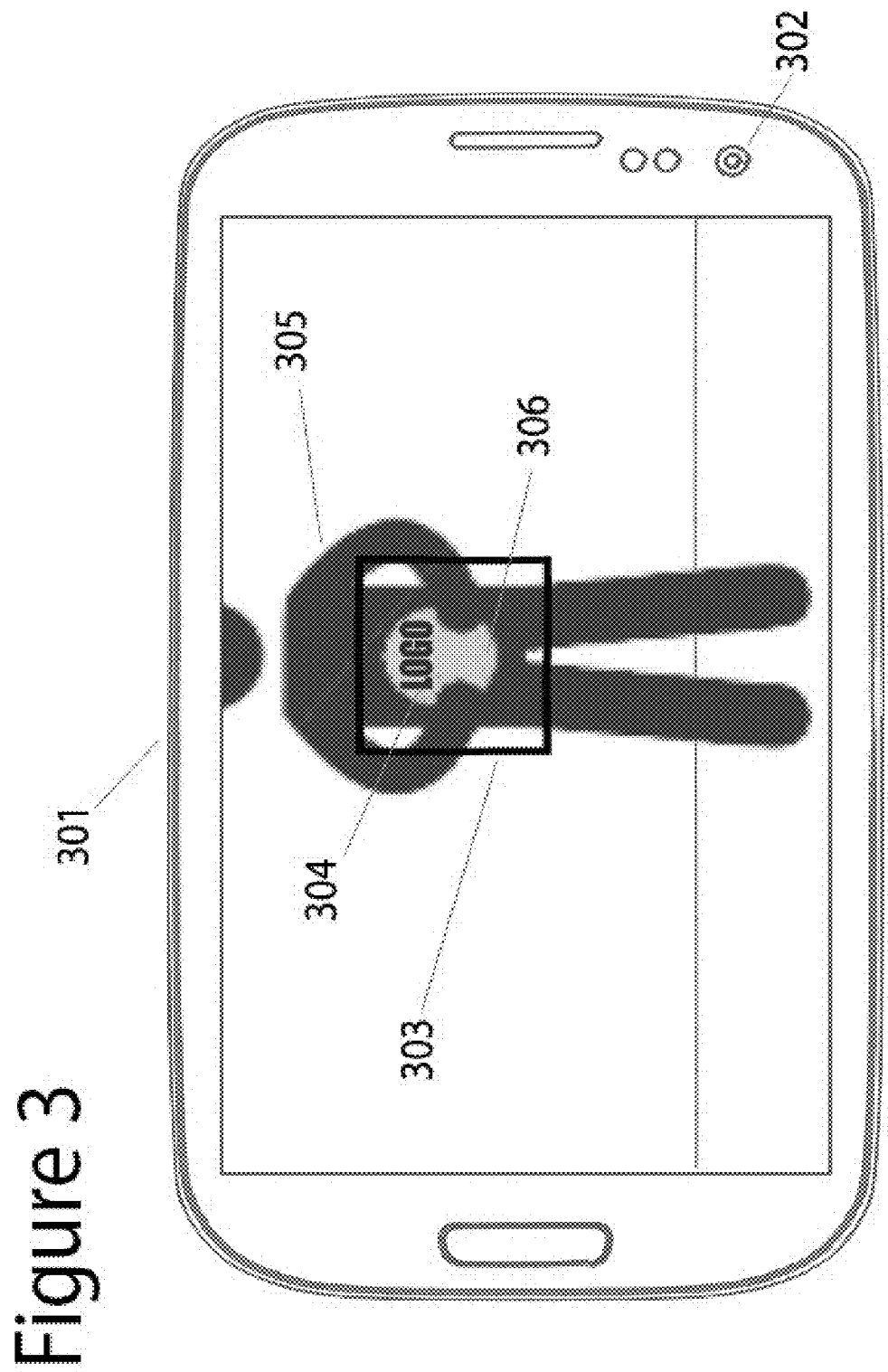
FIG. 3 illustrates a mobile device screenshot before and during calibration.

A computer processor (not shown) of the mobile device 102 may provide a calibration screen 201, as depicted in FIG. 3.

As illustrate in FIG. 2, at block 205, the computer processor of the mobile device 102 may overlay a shape graphic 303 on a fixed area of a screen 103 of the mobile device. The shape 303 may cover a fixed, small area of the screen. At block 210, the camera 104 the mobile device 102 may continuously search 202 the small area covered by the shape graphic 303 for a ball 306 with a specific marking 304. In an example, the marking 304 may be a logo. From a processing perspective, only the fixed area 303 is scanned for the marking 304, as opposed to scanning the entire video frame, permitting faster and/or more accurate processing and marking recognition. In an example, specific marking templates may be preloaded into the software, so that the mobile device 102 recognizes specific markings 304 and intentionally ignores balls 306 with other markings.

Marking recognition provides a form of access control, whereby the mobile device 102 may run only for balls with specific brands or markings. This is advantageous for restricting use of the software of the mobile device 102 for users of only specific brands of balls 306. Marking or brand recognition is accomplished via common feature recognition computer vision algorithms, such as cross correlation feature recognition and/or image matching. The markings that the mobile device 102 recognizes and grants access to may be preloaded in the software before software execution. Markings may be any image, text, or shape. Additionally, marking recognition may permit the user 107 to start the calibration/tracking deliberately and with intention. The user 107, 305 may move the ball 106, 306 around and get comfortable, but the mobile device 102 may only calibrate and start tracking when the user 305 shows the marking 304 in the overlayed shape 303 in the calibration screen of FIG. 3.

If, at block 215, the computer processor of the mobile device 102 recognizes an authorized marking 304 on a ball 306, then at block 220, the computer processor of the mobile device 102 may calibrate the movement of the ball 306 detected in the overlayed shape 303 in view of the recognized marking 304 of the ball 306. If, at block 215, the computer processor of the mobile device 102 does not recognize an authorized marking 304 on a ball 306, then processing returns to block 210 (searching the fixed area for a ball with a logo).

Calibration in this case may refer to sensing the marking-authenticated ball's 306 colors, lighting conditions, and/or ball pixel diameter. The mobile device 102 may then store this ball's 306 characteristic data into a memory (not shown) for more accurate tracking, such as determining ball color spectrum for color blob detection while ball tracking. Calibration is necessary because balls for the same sport are produced in non-identical colors, e.g., basketballs may be orange or brown, and environmental lighting is never the same, e.g., fluorescent indoor lighting and outdoor sunlight. This specific manner of calibration is advantageous because the mobile device 102 may only need to analyze a small area 303 of the video frame where it is known that there is a basketball, as opposed to scanning the entire video frame searching for an object with similar features to a ball profile preloaded in the memory. Focusing on only a specific, small area 303 of the video frame permits the mobile device 102 to use higher resolution and/or faster processing—so the mobile device 102 can more accurately sample the ball's 306 colors, shape, and/or shading.

Figure 4:
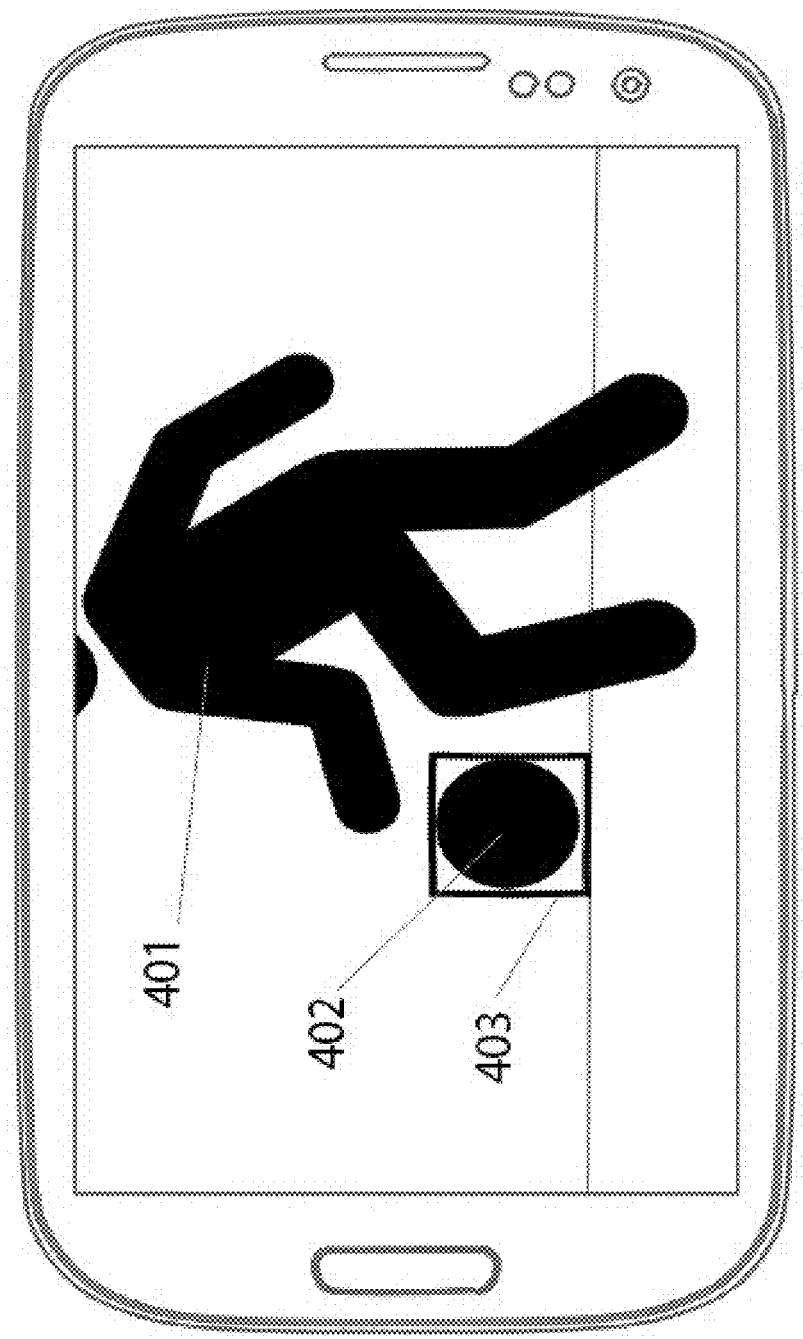
FIG. 4 illustrates the mobile device screen tracking the position of the ball as it moves in the field of view of the mobile device's camera.

After the automatic calibration is complete, at block 225, the camera 104 may track and may record data pertaining to the movement of the ball 306 that was sensed. The mobile device 102 may utilize well-established computer vision algorithms with custom parameters determined during calibration. The tracking algorithm may employ a technique such as color blob detection, shape recognition, and movement filtering. FIG. 4 illustrates the mobile device screen 301 tracking the position of the ball 402 as it moves in the field of view of the mobile device's camera 104, 302. As the mobile device 102 tracks the position of the ball 402 on screen, at block 206, the mobile device 102 may store the centroid position (in X and Y pixel coordinates) of the ball 106, a frame timestamp, and a ball pixel diameter 206 in the memory. In an example, the one or more metrics, e.g., dribble rate, may be calculated and displayed to the user in real-time. In one example, the one or more metrics may be calculated and displayed while ball tracking pertaining to the movement of the ball is taking place.

In an example, if, at block 230, the computer processor of the mobile device 102 detects that the ball 402 is no longer being manipulated by the user 205, e.g., the position of the ball remains relatively motionless for greater than a predetermined amount of time, e.g., five seconds or more, then at block 235, the mobile device 102 may stop tracking and may begin interpreting the recorded tracking data 206. In another example, the mobile device 102 may be configured to automatically stop tracking after a set amount of time, e.g., after 30 seconds. If, at block 230, the computer processor of the mobile device 102 detects that the ball 402 is still being manipulated by the user 205, then processing returns to block 225 (tracking and recording data pertaining to the movement of the ball).

In addition to analyzing horizontal and vertical movement, the mobile device 102 may estimate depth movement (in the Z-axis) of the ball 402, by examining ball pixel area in the recorded tracking data. By comparing the pixel diameter of the ball 402 to the original pixel diameter acquired during calibration, the mobile device 102 can estimate relative movement in the depth axis.

The mobile device 102 may analyze the pixel diameter of the tracked ball 402 and use that as a scale for physical measurements. Many balls for specific sports have regulated diameters, so the scale is preloaded and well known. The mobile device 102 may look up the preloaded diameter of the basketball corresponding to the logo detected, allowing the mobile device 102 may to dynamically determine physical scale for different balls with different logos. The mobile device 102 may employ a linear mathematical equation then relates pixels to physical dimensions, such as inches or centimeters. By the mobile device 102 estimating physical scale, via analyzing ball pixel diameter, of every video frame or just of the first calibration frame, the mobile device 102 may convert pixel tracking to physical tracking in a three-dimensional space. In a theoretical example, if the ball 402 has a diameter of one hundred pixels and corresponds to a true diameter of ten inches, a horizontal movement of five hundred pixels for the ball may correspond with fifty inches horizontal displacement.

At block 240, the computer processor of mobile device 102 may analyze the pixel movement of the ball in three dimensions and estimates true, physical movement in real three-dimensional space. At block 245, the mobile device 102 may then proceed to calculate one or more metrics that relate to an individual's ball controlling abilities from the data. At block 250, the mobile device may display the one or more metrics and interpretations on the screen 104 to the user 205.

In one example, the ball tracked may be a basketball. The metrics determined relate to dribbling, an important skill for basketball players. Dribbles may be determined by analyzing the movement of the ball 106, 402 in the Y-axis (vertical direction) and calculating relative maxima. One dribble is considered one bounce of the ball 106, 402 on the floor 108, expressed in camera movement as a downward motion followed by an upward motion. The mobile device 102 may identify with which hand the ball is being dribbled, and may indicate this characteristic in the tracking data. The mobile device 102 may differentiate with which hand the ball is being dribbled by examining relative horizontal locations of dribbles. If a dribble occurs on the left side of the screen and another dribble occurs on the right side of the screen, the mobile device 102 may differentiate the two and establishes a horizontal position threshold for differentiating left and right dribbles.

A crossover is a more advanced dribble used by basketball players. It is a dribble on an angle that crosses from the left to the right arms, and vice versa, literally crossing over from one side to the other. A crossover is detected by searching for dribbles that have an absolute change in position on the X-axis (horizontal direction) higher than a specific threshold. Direction of the crossover, whether left or right, is determined by examining the direction of the ball's movement.

For the basketball application of this invention, the metrics calculated may relate to dribble rate, crossover-width, location consistency, maximum dribble height, dribble rate variance, dribble speed, or dribble fatigue. Dribble rate may be determined by calculating the total number of dribbles per second. Dribble rate variation may be calculated by examining change in dribble rates over the period of time that the ball was tracked. Maximum dribble height may be determined by seeking the highest vertical position of the ball. Dribble consistency may be determined in three dimensions by calculating the relative standard deviation of dribbles in space. If crossover dribbles were detected, the mobile device 102 may calculate crossover consistency in a similar fashion. Crossover width may be calculated by examining the horizontal displacement of the ball 106, 402 during a crossover dribble event. The mobile device 102 may separately calculate left crossover dribble rate and right crossover dribble rate. The mobile device 102 may also separately calculate metrics separately for left and right non-crossover dribbles.

Figure 5:
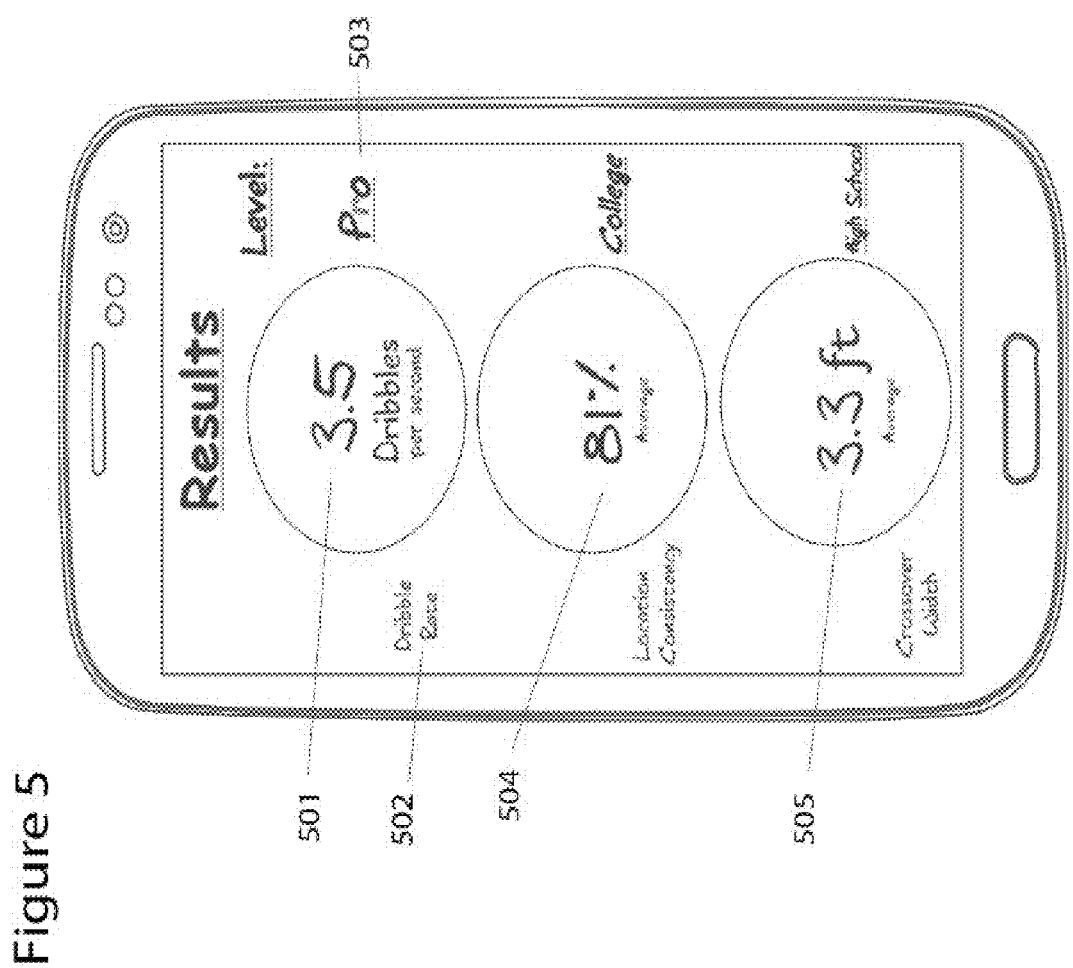
FIG. 5 illustrates metrics that may be displayed to the user on the mobile device screen.

The metrics may be displayed to the user 107 on the mobile device screen 103, 301, as shown in FIG. 5. Metrics may be displayed in physical units 501, 505, or as a percentage 504. The mobile device 102 may compare the metrics calculated with preloaded ranges corresponding to skill level 503. For example, skill level may be pro, college, or amateur. The mobile device 102 may also generate training suggestions based on the calculated metrics, such as comparing left and right hand dribble metrics. For example, if the dribble consistency of the left side is more accurate than the dribble consistency of the right hand, the mobile device 102 may suggest to the user 107 to practice dribbling with the right hand. Calculated metrics may be transmitted from the mobile device 102 to a web server or social media site, or sent via message or data transfer to another recipient. Users 107 may compete with each other by comparing calculated metrics with other users 107.

Figure 6:
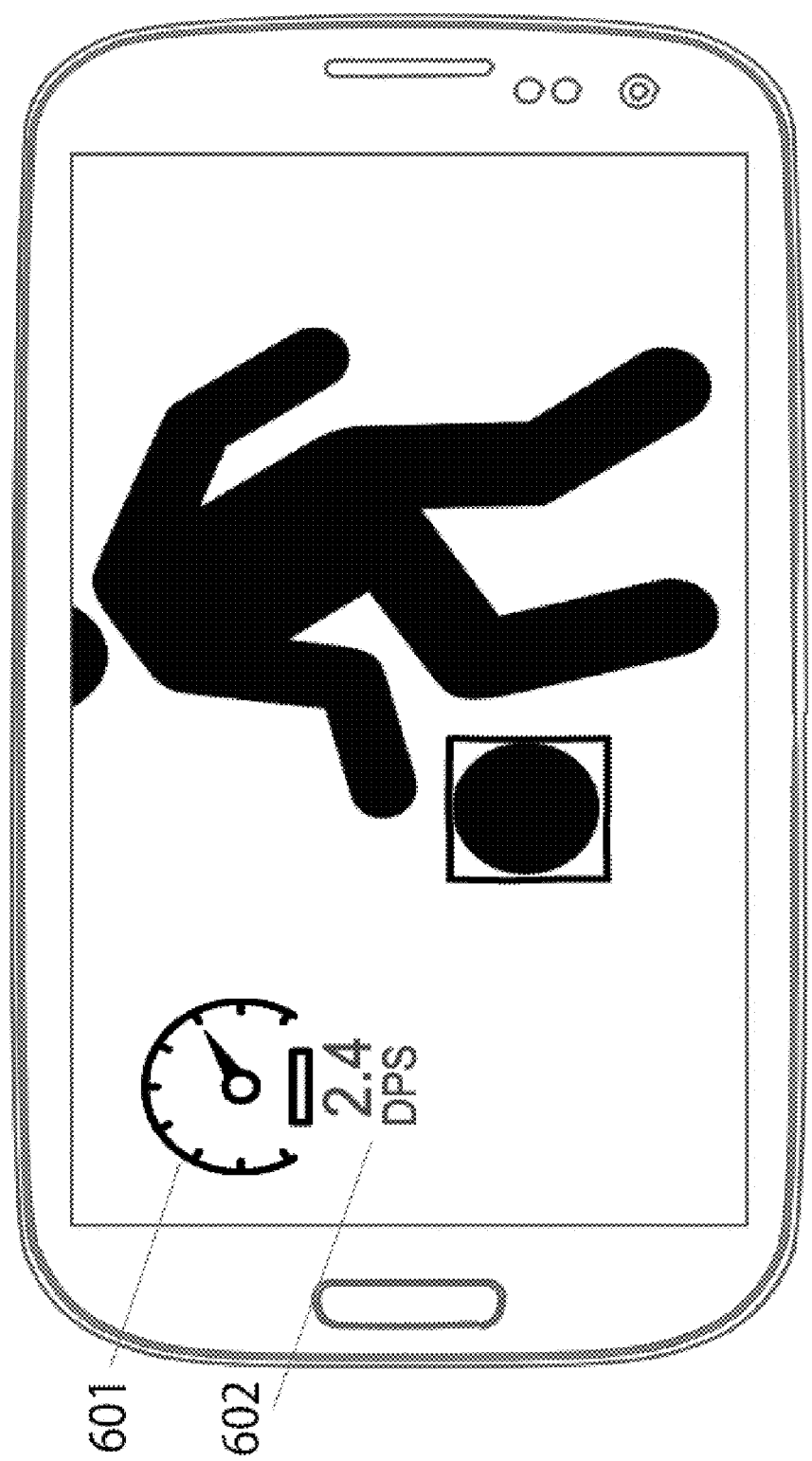
FIG. 6 illustrate a mobile device screenshot with live metric overlayed during tracking.

In one example, the mobile device 102 may display metrics on screen while tracking the ball, as shown in FIG. 6. Metrics may be calculated live (e.g., in real time); average metrics may be running averages that update. For example, a dribble counter would increment live with every dribble that the mobile device 102 detects. Dribble rate and dribble speed may be calculated simultaneously as tracking progresses, and then overlaid 602 on the tracking screen. An icon 601, such as a speedometer, may be displayed next to the metric being calculated live to provide a visual indication and descriptor.

Figure 7:
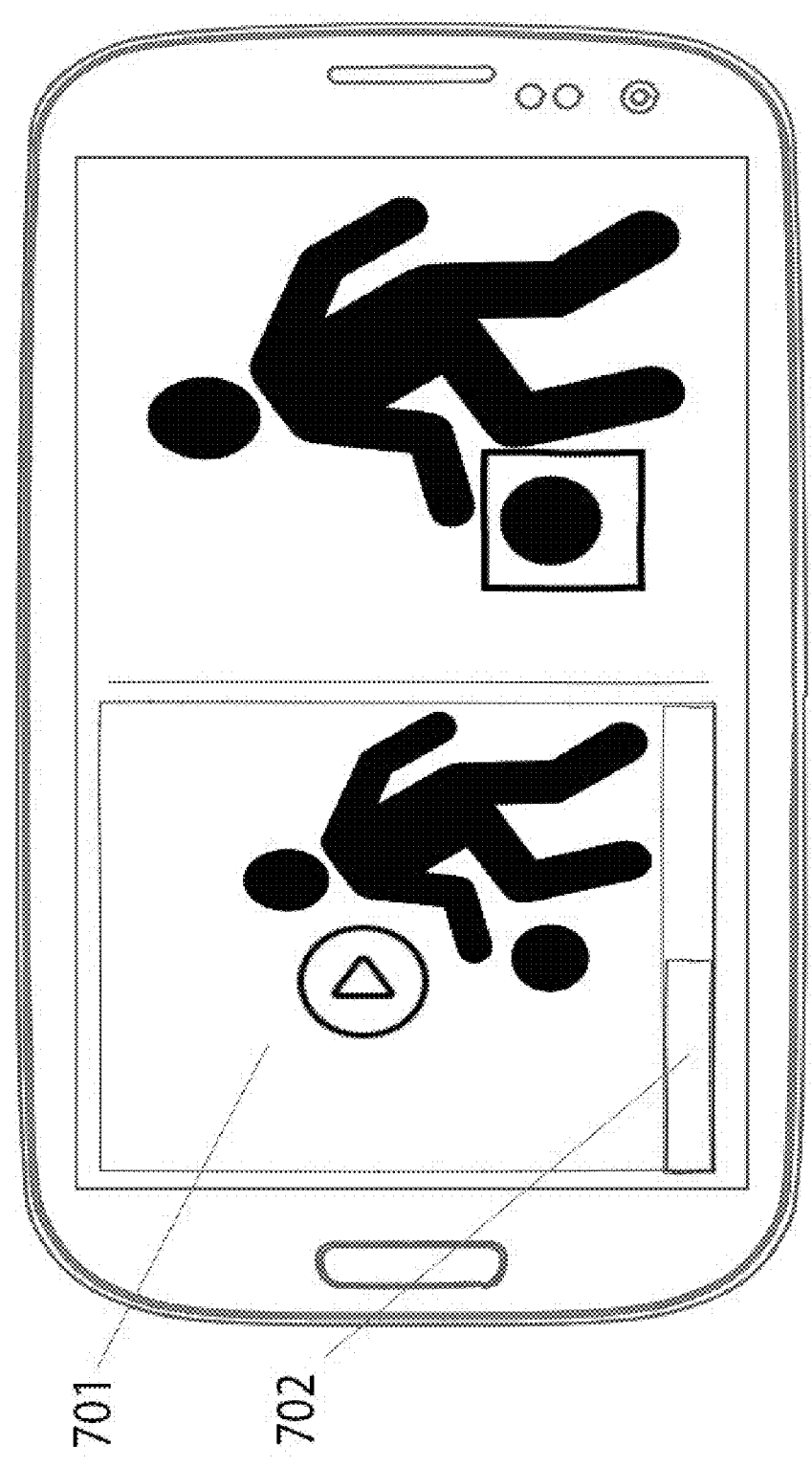
FIG. 7 illustrates the tracking system utilized with a training program.

In one example, the tracking system may be provided with a training program, as shown in FIG. 7. A training video 701 of a character or person executing dribbling actions plays side by side with the ball tracking screen. After the training video finishes, the tracking stops and the mobile device 102 may compare the optimal ball movements—the movements that are displayed in the training video 701, with the movements that the user 107 completed in reality. The mobile device 102 may compare reaction rate, e.g., the time difference between what is displayed on the instructional video and when the user 107 completes that movement. The mobile device 102 may interpret overall success rate of the user 107 by comparing how well the ball movements of the user 107 match the instructional video character's ball movements.

In another example, the sport involved is soccer. With soccer, the computer vision system within the mobile device 102 may focus on juggling, as opposed to dribbling. The one or more metrics may related to juggle location consistency, maximum height, or number of juggles. A juggle is detected similarly to a dribble, by analyzing the Y-axis movement of the ball 106 and calculating local maxima. One juggle is the upward Y-axis movement followed by a downward Y-axis movement. Metrics may be calculated live (e.g., in real time), for example, a juggle counter would increment live with every juggle that the mobile device 102 detects. The juggle counter would reset upon detection of a juggle interruption, such as, but not limited to, the soccer ball hitting the floor (determined by the Y axis movement of the ball). The mobile device 102 may calculate metrics similar to basketball metrics, including but not limited to, juggle location consistency, maximum height, and number of juggles.

Figure 8:
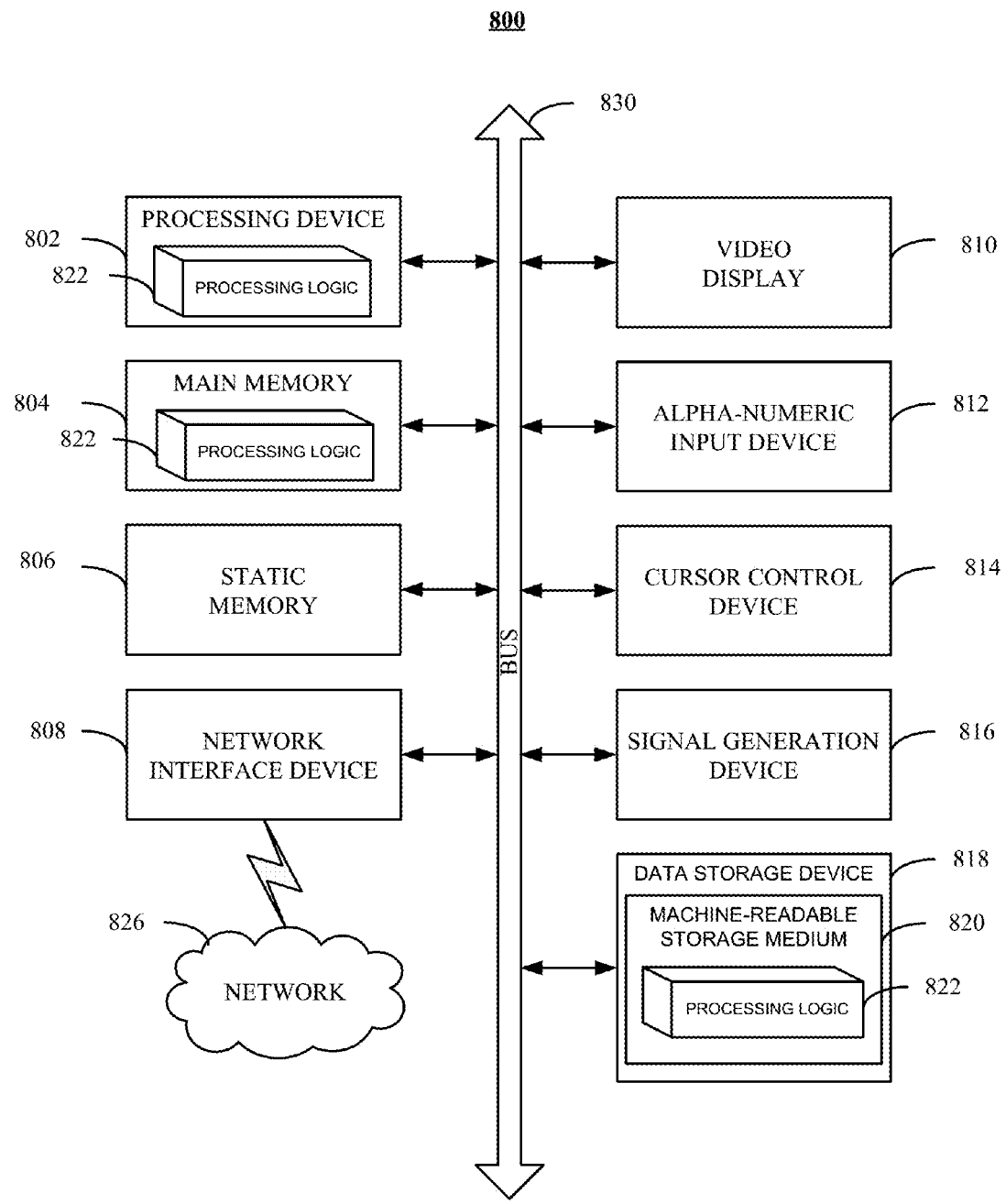
FIG. 8 illustrates a diagrammatic representation of a machine in the example form of a computer system within which a set of instructions, for causing the machine to perform any one or more of the methodologies discussed herein, may be executed.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute processing logic 822 for performing the operations and steps discussed herein.

Computer system 800 may further include a network interface device 808. Computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

Data storage device 818 may include a machine-readable storage medium (or more specifically a computer-readable storage medium) 820 having one or more sets of instructions embodying any one or more of the methodologies of functions described herein. Processing logic 822 may also reside, completely or at least partially, within main memory 804 and/or within processing device 802 during execution thereof by computer system 800; main memory 804 and processing device 802 also constituting machine-readable storage media. Processing logic 822 may further be transmitted or received over a network 826 via network interface device 808.

Machine-readable storage medium 820 may also be used to store the processing logic 822 persistently. While machine-readable storage medium 820 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the exemplary embodiments are merely illustrative of the invention and that many variations of the above-described embodiments may be devised by one skilled in the art without departing from the scope of the invention. The scope of the disclosure should, therefore, be determined with reference to the appended claims, along with the full scope of equivalents to which such claims are entitled.

What is claimed is:

1. A method, comprising:
    overlaying, by a computer processor of the mobile device, a shape graphic on a fixed area of a screen of the mobile device;
    searching, by a camera of the mobile device, the fixed area for a ball with a marking authorized by the mobile device for enabling calibration and tracking;
    recognizing, by the computer processor, the authorized marking on the ball;
    calibrating, by the computer processor, characteristics of the ball in the overlayed shape graphic for tracking of the ball in view of the authorized marking on the ball;
    tracking and recording, by the camera, data pertaining to the movement of the ball;
    calculating, by the computer processor, one or more metrics relating to ball controlling abilities from the data; and
    displaying, by the computer processor, the one or more metrics on the screen, wherein the one or more metrics are calculated and displayed while ball tracking pertaining to the movement of the ball is taking place;
    displaying, by the processing device, a training video of a character or person executing movements of the ball on the screen of the mobile device; and
    comparing, by the processing device, the movements of the ball in the training video to the movements of the ball while ball tracking is taking place.

2. The method of claim 1, wherein the computer processor calculates the one or more metrics and displays the one or more metrics responsive to the computer processor detecting that the ball is no longer in motion or a specified time is reached.

3. The method of claim 1, wherein the marking is a logo.

4. The method of claim 1, wherein the camera is a front-facing camera of the mobile device.

5. The method of claim 1, wherein the one or more metrics are calculated and displayed in real-time.

6. The method of claim 1, wherein recognizing applies to balls with specific brands or markings.

7. The method of claim 1, wherein recognizing the marking on the ball further comprises applying feature recognition computer vision algorithms to data captured by the computer processor pertaining to the marking.

8. The method of claim 7, wherein the feature recognition computer vision algorithms comprise at least one of cross-correlation feature recognition or image matching.

9. The method of claim 1, wherein the marking is recognized based on at least one of image, text, or shape.

10. The method of claim 1, wherein calibrating further comprises recognizing one or more colors of the marking and the ball, lighting conditions, or ball pixel diameter.

11. The method of claim 1, further comprising determining, by the computer processor, ball color spectrum for color blob detection while tracking the movement of the calibrated ball.

12. The method of claim 1, wherein tracking the movement of the calibrated ball comprises employing color blob detection, shape recognition, or movement filtering.

13. The method of claim 1, further comprising displaying, by the screen, a live video feed while the computer processor is tracking the ball.

14. The method of claim 1, wherein responsive to the camera tracking position of the ball on the screen, the computer processor calculates and stores the centroid of the ball, a frame timestamp, and a ball pixel diameter in a memory.

15. The method of claim 1, further comprising estimating, by the computer processor, depth movement of the ball by examining ball pixel area in the recorded tracking data.

16. The method of claim 15, wherein estimating depth movement of the ball comprises comparing the pixel diameter of the ball to the original pixel diameter acquired during calibration.

17. The method of claim 1, further comprising, looking up, by the computer processor in a memory of the mobile device, preloaded diameter of the ball corresponding to the marking detected; and
dynamically determining physical scale for different balls with different markings.

18. The method of claim 17, converting pixel tracking to physical tracking of the ball in a three-dimensional space in view of determining physical scale.

19. The method of claim 18, further comprising,
analyzing pixel movement of the ball in three dimensions; and
estimating true physical movement in real three-dimensional space.

20. The method of claim 1, wherein the ball is a basketball and the one or more metrics comprises at least one of dribble rate, crossover-width, location consistency, maximum dribble height, dribble rate variance, dribble speed, or dribble fatigue.

21. The method of claim 1, wherein the ball is a soccer ball and the one or more metrics comprises at least one of juggle location consistency, maximum height, and number of juggles.

22. The method of claim 1, further comprising providing a training program that employs the data.

23. A mobile device, comprising:
a memory;
a computer processor, operatively coupled to the memory;
a screen, coupled to the computer processor; and
a camera, coupled to the computer processor, the camera to:
search a fixed area of the screen for a ball with a marking authorized by the mobile device for enabling calibration and tracking; and
track and record data pertaining to the movement of the ball;
the computer processor to:
overlay a shape graphic on the fixed area of the screen;
recognize the authorized marking on the ball;
calibrate characteristics of the ball in the overlayed shape graphic for tracking of the ball in view of the authorized marking on the ball;
calculate one or more metrics relating to ball controlling abilities from the data;
display the one or more metrics on the screen, wherein the one or more metrics are calculated and displayed while ball tracking pertaining to the movement of the ball is taking place;
display a training video of a character or person executing movements of the ball on the screen of the mobile device; and
compare the movements of the ball in the training video to the movements of the ball while ball tracking is taking place.

24. The mobile device claim 23, wherein the one or more metrics are calculated and displayed in real-time.

25. The mobile device of claim 23, further comprising a positioning apparatus, wherein the mobile device is configured to be placed in the positioning apparatus.

26. The mobile device of claim 25, wherein the mobile device is configured to be placed in the positioning apparatus at a high enough angle to permit video capture of the ball, the user, and a floor on which the user stands.

27. The mobile device of claim 26, wherein the angle is between sixty and ninety degrees.

* * * * *